3,288,737
PLASTIC ASBESTOS TILE

Morimasa Arakawa, Higashi-ku, Osaka-shi, and Hiroshi Yoshioka and Yosinori Hiro, Asahi-ku, Osaka-shi, Japan, assignors to Arakawa Rinsan Kagaku Kogyo Kabushiki Kaisha, Higashi-ku, Osaka-shi, Japan
No Drawing. Filed Mar. 9, 1964, Ser. No. 350,567
Claims priority, application Japan, Mar. 18, 1963, 38/14,612
5 Claims. (Cl. 260—27)

This invention relates to the plastic asbestos tiles. More particularly, the invention pertains to a plastic asbestos tile, the binder of which is comprised of a mixture of a vinyl resin and a specific modified rosin.

In the prior art, the plastic asbestos tile, the binder of which is comprised of a vinyl resin, such as polyvinyl chloride homopolymers, vinyl chloride-vinyl acetate copolymers or vinyl chloride-vinylidene chloride copolymers, and any other resin, such as limed rosin, ester gum, rosin modified phenol resin, cumarone resin or petroleum resin, has been manufactured by mixing the binder with a filler, a plasticizer, and asbestos at a temperature ranging from 120° to 170° C. The application of heat of such a high temperature, however, produces a discoloring phenomenon in the resultant articles due to the dehydrochlorination of the vinyl resin employed, although said application of heat is inevitable for carrying out a homogeneous mixing of the tile composition. In order to prevent said discoloring phenomenon, accordingly, it is required to add to the tile composition a costly stabilizing agent, such as lead or barium-cadmium stabilizer.

The main object of the present invention is accordingly the provision of a plastic asbestos tile which does not exhibit the discoloring phenomenon even when manufactured at a high temperature as exemplified before.

Another object of the present invention is the provision of a plastic asbestos tile which is completely protected from discoloring without the application of a costly stabilizer.

A further object of the present invention is the provision of a plastic asbestos tile which can be provided with a desired color ranging from light to dark shades.

Other objects and specific features of the present invention will become apparent from the following:

According to the principles of the present invention, there is employed in the invention a specific binder which is comprised of a mixture of vinyl resin, such as polyvinyl chloride homopolymers, vinyl chloride-vinyl acetate copolymers or vinyl chloride-vinylidene chloride copolymers, and a metal modified rosin of a ball and ring softening point of from 70° to 190° C., said metal modified rosin being a reaction product of (A) the addition compound of (i) a rosin selected from the group consisting of rosin and rosin esters wherein at least 6 to 75 mol percent, preferably 15 to 75 mol percent, of the resin acid component of said rosin or rosin esters contains conjugated double bonds and (ii) an α,β-unsaturated dibasic acid; and (B) at least one member of the group consisting of oxides, hydroxides and acetates of metals of the second group of the periodic table whereby at least one of the carboxyl groups of said addition compound is converted to salt form by a metal of the second group of the periodic table.

The aforespecified metal modified rosin employed in the present invention is manufactured from a rosin, a rosin ester, or a mixture of said rosin and rosin ester. Said rosin includes gum rosin, wood rosin, tall oil rosin, and partially polymerized rosins, the resin acid component of said rosin containing at least 6 mole percent, preferably from 15 to 75 mole percent conjugated double bonds; and said rosin ester includes glycerol ester, ethylene glycol ester, diethylene glycol ester, and pentaerythritol ester, the resin acid component of said rosin esters also containing at least 6 mole percent, preferably from 15 to 75 mole percent conjugated double bonds.

The starting rosin or rosin ester specified above may in itself contain a resin acid or resin acids having a conjugated bond or an ester of said acid or acids, namely, such as levopimaric acid, abietic acid, neoabietic acid or palustric acid, or an ester of said acids. Said conjugated double bond can also be formed by heating in the process of reaction with an α,β-unsaturated dibasic acid. In any case, the rosin or rosin ester employed in the present invention should contain at least 6 mole percent, preferably from 15 to 75 mole percent, resin acid or ester of said acid having a conjugated double bond in itself or formed in the process of the reaction with said dibasic acid.

The α,β-unsaturated dibasic acid employed in the present invention includes not only dibasic acids themselves, such as maleic acid, fumaric acid, itaconic acid, and citraconic acid, but also the anhydrides of said acids, such as maleic acid anhydride, itaconic acid anhydride, and citraconic acid anhydride. To prepare the desired metal modified rosin, any of the aforespecified rosins or rosin esters or mixtures of said rosins and rosin esters is reacted, in the first place, with at least one species of the aforespecified α,β-unsaturated dibasic acids in the weight ratio of 100 parts of the starting rosin material to from 2 to 25 parts, preferably from 5 to 15 parts, of any of said α,β-unsaturated dibasic acids. The reaction is carried out at a temperature ranging from 200° to 240° C. and completes in from 30 to 120 minutes. The amount of said dibasic acid to be employed is dependent upon the amount of the resin acid or ester of said acid having a conjugated double bond present in the starting rosin material. Employment of said dibasic acid in excess where unreacted dibasic acid remains in the resultant product hampers the compatibility with and dispersibility in the vinyl resin to be added thereafter, and decreases the water-resistance and anti-alkalinity of the finished tiles.

To prepare the desired metal modified rosin, the resultant intermediate product prepared in the aforestated manners is then reacted at a temperature ranging from 200° to 250° C. with at least one species selected from the group of oxides, hydroxides and acetates of the metals belonging to the second group of the Periodic Table, such as magnesium, calcium, zinc, cadmium, and barium, preferably calcium and zinc, in such a manner that at least one of the carboxyl groups of said addition compound forms a salt with the metal of said metallic compound employed. Employment in excess of said metallic compound raises the softening point of the resultant product, rendering it hard to carry out the mixing of the tile composition. The preferable range of application of said metallic compound is accordingly in the weight ratio of from 2 to 10 metal parts, particularly from 2 to 6 metal parts, of said metallic compound to 100 parts of the starting rosin material. The reaction takes place easily when an acetate of said metals is employed. When an oxide or hydroxide of said metals is employed singly, the reaction usually lasts from 2 to 3 hours. Said retarded reaction period, however, can be accelerated to about 1 hour when a metallic acetate is added in a small amount to the metallic oxide or hydroxide employed. The metal modified rosin thus prepared and employed in the present invention is required to have a ball and ring softening point of from 70° to 190° C.

The metal modified rosin thus prepared is mixed in the present invention with known additives in association with a vinyl resin, such as polyvinyl chlorides, vinyl chloride-vinylidene chloride copolymers and vinyl chloride-vinyl acetate copolymers. The additives employed in the present invention include a plasticizer, such as butylbenzyl phthalate, mixed ortho and para ethyl toluene sulfonamides, phthalyl glycolates, 2-ethylhexyl phthalate, dibutyl phthalate, dioctyl phthalate, dibutyl adipate, tricresyl phosphate, and epoxidized soya bean oil; a filler, such as calcium carbonate, magnesium carbonate, and talc; and asbestos. There may be added a pigment, such as titanium oxide, carbon black, iron oxide, or iron ochre, which is normally included in the filler in determining the quantities of the ingredients of the tile composition.

In the present invention, the aforespecified metal modified rosin acts as a binder and as an anti-discoloring agent as well, so that there is no need of employing a costly stabilizer or binder. But the employment of lead or barium-cadmium stabilizers and limed rosin, ester gum, rosin modified phenol resin, cumarone resin, petroleum resin or polymerized oil binders is not necessarily excluded from the principles of the present invention.

The tile composition of the present invention contains the following ingredients in the following percentages by weight:

|  | Maximal Composition Ratio in Percent | Optimal Composition Ratio in Percent |
| --- | --- | --- |
| Filler and pigments | 20–70 | 30–50 |
| Asbestos | 15–50 | 20–30 |
| Plasticizers | 2–15 | 5–10 |
| Metal modified rosin of a ball and ring softening point of from 70° to 190° C. as described above | 1–15 | 2–8 |
| Vinyl resin, such as polyvinyl chlorides, vinylchloride-vinylidene chloride copolymers, vinyl chloride-vinyl acetate copolymers | 6–30 | 10–20 |

In the present invention, the aforesaid metal modified rosin is pulverized and blended at room temperature with the other ingredients specified before. The resultant tile composition is then charged to the Banbury mixer to be mixed at a temperature ranging from 130° to 150° C.; passed to the rolls, the cold roll of which is maintained at a temperature from 70° to 80° C. and the hot roll at a temperature between 160° to 170° C.; and calendered at from 40° to 100° C. The resultant sheet is then heated to 160° C. or thereabout where necessary, cooled by means of water, air or both, and is cut into the desired tile shape.

In the following table are shown the findings of the discoloring tests performed on the finished tiles of the present invention in comparison with the conventional tiles:

|  | Sample | Heating period | | |
| --- | --- | --- | --- | --- |
|  |  | 10 min. | 30 min. | 60 min. |
| Tiles of the Present Invention | 1 | − | + | + |
|  | 2 | − | + | + |
|  | 3 | − | − | + |
|  | 4 | − | − | + |
| Conventional Tiles | 1a | + | ++ | +++ |
|  | 2a | ++ | +++ | ++++ |
|  | 3a | + | ++ | +++ |
|  | 4a | ++ | +++ | ++++ |

Symbols employed:
− almost completely free from discoloring.
+ slightly discolored.
++ lightly discolored.
+++ fairly discolored.
++++ turned dark.

N.B. The findings shown in the table are obtained by heating at 170° C. for a period of time as specified the samples prepared in the following manners:

Samples 1 to 4 are final product of Examples 1 to 4 to be appended hereto;

Samples 1a to 4a are prepared in the following manners:

*Sample 1a.*—100 kg. gum rosin was melted at 220° C. in the same reactor as employed in Example 1, and 5 kg. calcium hydroxide and 200 gram calcium acetate were added. The mixture was then allowed to react with stirring for 1 hour at 220° C., producing a limed rosin of an acid number of 85 and of a ball and ring softening point of 125° C. 30 parts by weight of said limed rosin were then employed in the place of the metal modified rosin of Example 1, and the mixture was manufactured into plastic asbestos tiles in accordance with the manners as described in Example 1;

*Sample 2a.*—90 kg. gum rosin and 10 kg. maleic anhydride were reacted in the same manners as described above, producing a resin of an acid number of 280 and of a ball and ring softening point of 108° C. 30 parts by weight of the resultant resin were then employed in the place of the metal modified rosin of Example 1, and the mixture was manufactured into plastic asbestos tiles in accordance with the manners as described in Example 1;

*Sample 3a.*—90 kg. gum rosin and 10 kg. maleic anhydride were reacted at 220° C. for 1 hour in the same reactor as employed in Example 1. The resultant product was then treated with 18 kg. glycerol at 270° C. for 5 hours, producing an ester of an acid number of 22 and of a ball and ring softening point of 116° C. 30 parts of weight of the resultant product were then employed in the place of the metal modified rosin of Example 1, and the mixture was manufactured into plastic asbestos tiles in accordance with the manners as described in Example 1; and

*Sample 4a.*—90 kg. rosin, 10 kg. maleic anhydride and 8 kg. glycerol were reacted and manufactured into plastic asbestos tiles in accordance with the manner as described in association with Sample 3a.

From the table appended hereinbefore, it will apparent that the tiles of the present invention are almost completely free from the discoloring action or phenomenon. At the same time, the tiles of the present invention can be provided with a desired color ranging from a dark to a pale yellow shade by simply incorporating in the tile composition a desired pigment.

For a fuller understanding of the present invention, reference is made to the following examples which are illustrative only and in which all parts are by weight:

*Example 1*

In a 200-liter stainless steel reactor were placed 90 kg. of gum rosin containing 75 mole percent resin acid having a conjugated double bond, and melted at 220° C. 10 kg. of maleic anhydride were added thereto, and the mixture was reacted with stirring at 220° C. for 30 minutes. There were then added 5 kg. of calcium hydroxide and 200 grams of calcium acetate, allowing the mixture to react at 220° C. for 1 hour, producing a brittle resinous composition of an acid number of 130 and of a ball and ring softening point of 143° C. 15 parts of the resultant metal modified rosin were completely pulverized. There were then added 100 parts of a copolymer consisting of 92 weight percent vinyl chloride and 8 weight percent vinyl acetate, and the mixture was blended with 150 parts of asbestos, 200 parts of calcium carbonate, 15 parts of dioctyl phthalate, 15 parts of tricresyl phosphate, and 20 parts of titan white. The resultant tile composition was charged to the Banbury mixer and mixed at 140° C. for 5 minutes; passed for 6 minutes through the rolls, the cold roll of which was maintained at 70° C. and the hot roll at 160° C.; calendered at the roll interval of 2 mm.; sheeted out, and cut into tiles. The resultant tiles exhibited no traces of discoloring when manufactured and were almost completely free from discoloring even when heated at 170° C. for 10 minutes. Heat resistance was also markedly improved.

*Example 2*

95 kg. of a partially polymerized rosin of an acid number 148 and of a ball and ring softening point of 92° C. and containing 24 mole percent resin acid having a conjugated double bond, 5 kg. of maleic anhydride, 5 kg. of calcium hydroxide, and 200 grams of calcium acetate were reacted as in Example 1, producing a metal modified rosin of an acid number of 85 and of a ball and ring softening point of 162° C. 30 parts of the resultant rosin were pulverized and employed in the place of the metal modified rosin of Example 1, and the mixture was manufactured into plastic asbestos tiles as described in Example 1, exhibiting no traces of discoloring.

*Example 3*

90 kg. of gum rosin containing 75 mole percent resin acid having a conjugated double bond, 10 kg. of fumaric acid, and 12 kg. of zinc acetate were reacted as in Example 1, producing a metal modified rosin of an acid number of 170 and of a ball and ring softening point of 122° C. 40 parts of the resultant product were pulverized and employed in the place of the metal modified rosin of Example 1, and the mixture was manufactured into plastic asbestos tiles as described in Example 1, exhibiting no traces of discoloring.

*Example 4*

90 kg. of gum rosin containing 75 mole percent resin acid having a conjugated double bond, 10 kg. of maleic anhydride, 25 kg. of calcium hydroxide, and 6 kg. of zinc acetate were reacted as in Example 1, producing a metal modified rosin of an acid number of 188 and a ball and ring softening point of 135° C. 30 parts of the resultant rosin were pulverized and employed in the place of the metal modified rosin of Example 1, and the mixture was manufactured into plastic asbestos tile, exhibiting no traces of discoloring.

We claim:
1. A plastic asbestos tile comprising:
 (1) 6–30% of a vinyl resin selected from the group consisting of polyvinyl chloride homopolymers, vinyl chloride-vinylidene chloride copolymers, and vinyl chloride-vinyl acetate copolymers;
 (2) 2–15% plasticizers;
 (3) 20–60% fillers and pigments;
 (4) 15–50% asbestos; and
 (5) 1–15% of a metal modified rosin having a ball and ring softening point of from 70° to 190° C. consisting essentially of the reaction product at 200° to 250° C. of,
  (A) the reaction product of
   (i) a rosin selected from the group consisting of rosin and rosin esters, wherein at least 6 to 75 mol percent of the resin acid component of said rosin and rosin esters contains conjugated double bonds, and
   (ii) an $\alpha,\beta$-unsaturated dibasic acid; and
  (B) at least one member of the group consisting of an oxide, hydroxide, and acetate of a metal selected from the group consisting of magnesium, calcium, zinc, cadmium, and barium.

2. The plastic asbestos tile of claim 1, wherein the $\alpha,\beta$-unsaturated dibasic acid to be employed is selected from the group consisting of maleic acid, fumaric acid, itaconic acid, citraconic acid, maleic acid anhydride, itaconic acid anhydride, and citraconic acid anhydride.

3. The plastic asbestos tile of claim 1 wherein the metal modified rosin is prepared by reacting the rosin with said $\alpha,\beta$-unsaturated dibasic acid in the weight ratio of 100 parts of said rosin to from 2 to 25 parts of said acid at a temperature ranging from 200 to 240° C. and by reacting the resulting reaction product (A) with said member (B) in a weight ratio of 100 parts of the starting rosin (i) to from 2 to 10 parts metal weight of said member (B).

4. The plastic asbestos tile of claim 3, wherein the starting rosin material to be employed is selected from the group consisting of gum rosin, wood rosin, tall oil rosin, partially polymerized rosin, glycerol rosin ester, ethylene glycol rosin ester, diethylene glycol rosin ester, and pentaerythritol rosin ester.

5. The plastic asbestos tile of claim 3, wherein the $\alpha,\beta$-unsaturated dibasic acid to be employed is selected from the group consisting of maleic acid, fumaric acid, itaconic acid, citraconic acid, maleic acid anhydride, itaconic acid anhydride, and citraconic acid anhydride.

References Cited by the Examiner
UNITED STATES PATENTS

| | | | |
|---|---|---|---|
| 2,378,377 | 6/1945 | Bare | 260—27 |
| 2,395,278 | 2/1946 | Kalman | 260—105 |
| 2,529,260 | 11/1950 | Powers | 260—27 |

OTHER REFERENCES

Harris: Rosin and Rosin Derivatives Encyclopedia of Chemical Technology, 1953, page 787 relied on.

LEON J. BERCOVITZ, *Primary Examiner.*

F. McKELVEY, *Assistant Examiner.*